(12) United States Patent
Moberg et al.

(10) Patent No.: US 10,273,803 B2
(45) Date of Patent: Apr. 30, 2019

(54) IMPLEMENT SYSTEM FOR MACHINE AND OPERATING METHOD THEREFOR

(71) Applicant: Caterpillar Global Mining Europe GmbH, Lunen (DE)

(72) Inventors: Carl Moberg, Dunlap, IL (US); Brent Duppong, Cambridge, IA (US); Frank Kühnemund, Dresden (DE); Oliver Kortmann, Werne (DE); Carsten Butz, Dortmund (DE); Matthew Palmer, Peoria, IL (US)

(73) Assignee: Caterpillar Global Mining Europe GmbH, Lunen (DE)

( * ) Notice: Subject to any disclaimer, the term of this patent is extended or adjusted under 35 U.S.C. 154(b) by 176 days.

(21) Appl. No.: 15/380,387

(22) Filed: Dec. 15, 2016

(65) Prior Publication Data
US 2018/0171794 A1 Jun. 21, 2018

(51) Int. Cl.
| | |
|---|---|
| E21C 27/24 | (2006.01) |
| E21C 31/12 | (2006.01) |
| E21D 9/10 | (2006.01) |
| F16H 57/04 | (2010.01) |
| E21C 25/10 | (2006.01) |
| E02F 3/24 | (2006.01) |
| E02F 3/38 | (2006.01) |
| E21C 25/06 | (2006.01) |
| F16N 7/40 | (2006.01) |
| F16N 15/00 | (2006.01) |

(52) U.S. Cl.
CPC .............. *E21C 31/12* (2013.01); *E02F 3/246* (2013.01); *E02F 3/38* (2013.01); *E21C 25/06* (2013.01); *E21C 25/10* (2013.01); *E21C 27/24* (2013.01); *E21D 9/1026* (2013.01); *F16H 57/04* (2013.01); *F16H 57/0443* (2013.01); *F16N 7/40* (2013.01); *F16N 15/00* (2013.01); *F16N 2210/04* (2013.01); *F16N 2210/30* (2013.01)

(58) Field of Classification Search
CPC ....... E21C 31/12; E21C 27/24; E21D 9/1013; E21D 9/102; E21D 9/1026; E21D 9/1086; F16H 57/0443
See application file for complete search history.

(56) References Cited

U.S. PATENT DOCUMENTS

| | | | |
|---|---|---|---|
| 2,427,859 A * | 9/1947 | Jeffrey | E21C 31/12 137/45 |
| 3,467,436 A | 9/1969 | Pentith et al. | |
| 4,030,566 A * | 6/1977 | Cobb | B28D 1/26 184/6.13 |
| 4,162,104 A | 7/1979 | Kogler et al. | |

(Continued)

FOREIGN PATENT DOCUMENTS

| | | |
|---|---|---|
| DE | 202008014921 | 2/2009 |
| EP | 2641711 | 9/2013 |

(Continued)

*Primary Examiner* — Janine M Kreck
*Assistant Examiner* — Michael A Goodwin

(57) ABSTRACT

An implement system for a machine includes a boom housing a drive mechanism for a cutting implement, and having a plurality of oil outlet ports formed therein. A control mechanism is configured to receive data indicative of an expected change in location of the outlet ports relative to an oil fill line within the boom, and vary a pattern of incoming oil flow to limit entrainment of air in the oil.

20 Claims, 3 Drawing Sheets

(56) References Cited

U.S. PATENT DOCUMENTS

| | | | |
|---|---|---|---|
| 4,377,311 A | 3/1983 | Seller | |
| 6,062,650 A * | 5/2000 | Smith | E21C 35/24 |
| | | | 299/1.4 |
| 8,556,761 B1 | 10/2013 | Carlton | |
| 2013/0240299 A1 | 9/2013 | Jagdale et al. | |
| 2015/0204190 A1 * | 7/2015 | Krings | E21D 9/1026 |
| | | | 299/10 |
| 2016/0341299 A1 | 11/2016 | Gerges et al. | |

FOREIGN PATENT DOCUMENTS

| | | |
|---|---|---|
| EP | 2499333 | 4/2014 |
| EP | 3279516 | 2/2018 |
| GB | 2205881 A | 6/1988 |
| WO | 0075488 A1 | 12/2000 |

* cited by examiner

IMPLEMENT SYSTEM FOR MACHINE AND OPERATING METHOD THEREFOR

TECHNICAL FIELD

The present disclosure relates generally to an implement system in a machine, and more particularly to selectively pumping oil from ports in a boom of the implement system based upon locations of the ports relative to an oil fill line.

BACKGROUND

Many different machines are used for digging, dozing, transporting or otherwise manipulating all manner of materials. Those skilled in the art will be familiar with machine and implement technologies specialized for different material types such as various different types of soil, gravel, sand, and hard rock substrates. Mining, construction, forestry and other industries rely for their continued existence in the modern age upon availability of purpose-built machinery for various tasks and types of materials. While engineers have experimented with machinery and techniques for efficiently manipulating materials for literally centuries, for certain applications, there remains ample room for improvement.

In the case of hard rock mining, or tunnel boring through solid rock for road building or other large-scale construction practices, the state of the art has long been the so-called "drill-and-blast" technique. In drill-and-blast, holes are drilled through a rock substrate, then packed with explosives which are then detonated to break apart the solid material into more manageable pieces. The drill-and-blast technique is relatively inprecise, not to mention the various disadvantages that might be expected with regard to handling and use of explosives. In the case of certain softer rock materials such as chalk various direct boring machines have been proposed over the years. European Patent EP2499333 to Wilmer et al. is directed to a road header of generally typical design for use in mining that could apparently be used in a range of material types, with a machine frame and a cutting device positioned on a swiveling arm at an end of the machine frame.

SUMMARY OF THE INVENTION

In one aspect, an implement system for a machine includes a cutting implement, and a boom supporting the cutting implement and movable to position the cutting implement in contact with a material to be cut. The boom houses a drive mechanism for the cutting implement, and a plurality of oil outlet ports are formed in the boom, for draining oil conveyed through the boom in contact with the drive mechanism. The implement system further includes an oil pumping system for circulating the oil through the boom and including at least one pumping mechanism, a plurality of incoming oil conduits for connecting the at least one pumping mechanism to the plurality of oil outlet ports, and a control mechanism for varying a pattern of incoming oil flow. The control mechanism is configured to receive data indicative of an expected change in location of at least one of the plurality of oil outlet ports relative to an oil fill line within the boom. The control mechanism is further configured to vary the pattern of incoming oil flow based on the data indicative of an expected change in location by way of commanding switching the oil pumping mechanism between a first state receiving incoming oil flow through a first one of the plurality of incoming oil conduits and a second state receiving incoming oil flow through a second one of the plurality of incoming oil conduits, to limit entrainment of air in the circulated oil.

In another aspect, a machine includes a machine frame, and ground-engaging propulsion elements coupled to the machine frame. An implement system is further coupled to the machine frame and includes a cutting implement movable relative to the machine frame, and a boom supporting the cutting implement. A plurality of oil outlet ports are formed therein, and the boom houses a drive mechanism configured for lubrication and cooling by way of oil conveyed through the boom to the plurality of oil outlet ports. The machine further includes an oil pumping system for circulating the oil through the boom and including at least one pumping mechanism, a plurality of incoming oil conduits for connecting the at least one pumping mechanism to the plurality of oil outlet ports. The oil pumping system further includes a control mechanism configured to receive data indicative of a change in a position or an orientation of the cutting implement relative to the machine frame that varies an expected location of at least one of the plurality of oil outlet ports relative to an oil fill line in the boom. The control mechanism is further configured to command switching the oil pumping system based on the data indicative of a change in a position or an orientation of the cutting implement from a first state receiving incoming oil flow through a first one of the plurality of incoming oil conduits to a second state receiving incoming oil flow through a second one of the plurality of incoming oil conduits.

In still another aspect, a method of operating an implement system having a boom housing a drive mechanism lubricated and cooled by way of oil circulated through the boom includes monitoring a plurality of position parameters or orientation parameters of at least one of the boom or the cutting implement. The method further includes receiving data of the plurality of position parameters or orientation parameters indicative of an expected change to a location of an oil fill line in the boom relative to at least one of a first oil outlet port or a second oil outlet port each formed in the boom. The method further includes commanding switching an oil pumping system in the implement system based on the data from a first state receiving an incoming flow of oil from the first oil outlet port to a second state receiving an incoming flow of oil from the second oil outlet port.

DETAILED DESCRIPTION

Figure 1:
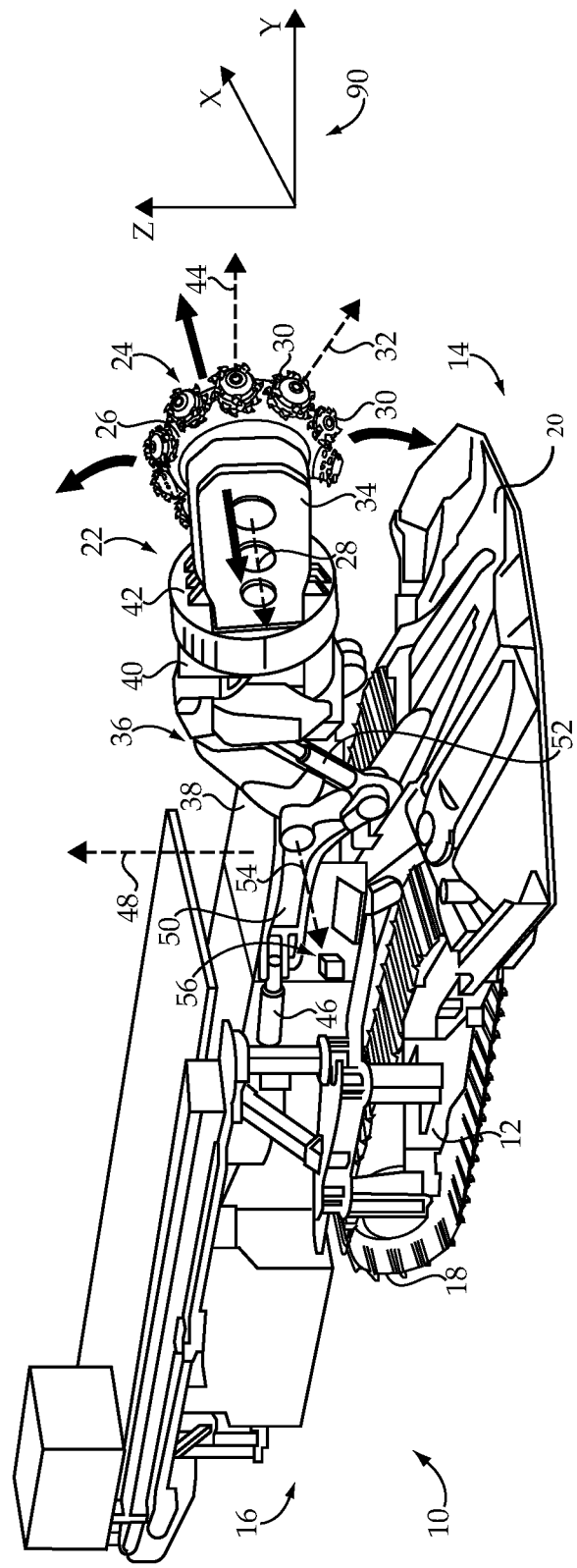
FIG. 1 is a diagrammatic view of a machine, according to one embodiment.

Referring to FIG. 1, there is shown a machine 10 according to one embodiment, and including a machine frame 12 having a front end 14 and a back end 16. Ground-engaging elements 18 in the nature of tracks or the like are coupled to machine frame 12 for propelling machine 10. In an implementation, machine 10 may be autonomous and capable of operating with no supervision or minimal supervision by a human operator. An apron 20 may be coupled to machine frame 12 at front end 14 to assist in feeding material cut from a material face such as a rock face through machine 10 in certain embodiments or during certain types of operations. Machine 10 may also be equipped with roof bolting apparatus (not shown), a power source such as an engine (not shown), and various other hardware for propulsion, navigation, and operation. Machine 10 may be well-suited to underground environments, particularly for cutting material (e.g. rock and/or the like) to form a tunnel for road building or mining, however, the present disclosure is not strictly limited as such. Machine 10 is also well-suited to other environments, such as above ground environments. An implement system 22 is positioned at front end 14 of machine frame 12 and operable in a manner and for purposes further discussed herein. As will be further apparent from the following description, machine 10 is uniquely configured for handling and managing lubrication and cooling of certain components of implement system 22.

Implement system 22 may include a cutting implement 24. Cutting implement 24 may be mounted to and supported by a boom 34 movable to position cutting implement 24 in contact with a material to be cut. Implement system 22 further includes an implement frame 36 that includes a base section 38 and a boom support section 40 mounted to base section 38. In one implementation, base section 38 may be rotatable in generally horizontal directions about a slew axis 48, with boom 34 being rotatable by way of the rotation of base section 38 about slew axis 48 relative to machine frame 12. An angular slew range might be from about 30 degrees to about 70 degrees. In FIG. 1, a slew actuator 46 is shown coupled between base section 38 and machine frame 12, and will typically be one of two slew actuators positioned upon opposite lateral sides of base section 38. A slew arm 50 extends between base section 38 and boom support section 40, and may be coupled with slew actuator 46. Implement system 22 may also further include one or more swing actuators 52, one of which is illustrated in FIG. 1. Each of the one or more swing actuators 52 may be coupled with boom support section 40 to rotate boom support section 40 and boom 34 in generally vertical directions about a swing axis 54. In one embodiment, boom 34 may be rotatable about swing axis 54 relative to machine frame 12 in an angular range that is from about 10 degrees to about 40 degrees. Implement system 22 may further include a wrist 42 coupled between boom 34 and implement frame 36. Wrist 42 may be rotatable to rotate boom 34 about a wrist axis 44. Boom 34 may be rotatable about wrist axis 44 in an angular rotation range relative to machine frame 12 that is at least 180 degrees. Many embodiments will enable wrist 42 to rotate continuously, in an angular range that is infinite. Wrist 42 is equipped with a rotary actuator not visible in FIG. 1.

It will be appreciated that the multiple axes of rotation about which boom 34 can be moved enable great flexibility in how boom 34 and thus cutting implement 24 can be positioned, oriented and manipulated. The relationship between the multiple degrees of freedom available for cutting implement 24, and considerations relating to lubricating and cooling certain components of implement system 22 will be further apparent from the following description. A coordinate system or coordinates 90 illustrating a Z-axis, an X-axis, and a Y-axis is also shown in FIG. 1. It can be appreciated that the Z-axis is generally a traditional Z-axis that could be considered a vertical axis and common with slew axis 48 when machine 10 is upon level ground. The X-axis may be a horizontal axis and common with swing axis 54, whereas the Y-axis may be a diagonal axis common with and defined by wrist axis 44.

It will be recalled that machine 10 and implement system 22 may be specially configured for cutting hard rock. While a variety of different cutting implements could potentially be mounted to boom 34 and used with implement system 22, in a practical embodiment cutting implement 24 includes a drum 26 rotatable about a drum axis 28 and a plurality of rock cutters 30 each with a plurality of rock cutting teeth (not numbered) positioned circumferentially about drum axis 28, and rotatable about a plurality of cutter axes 32 oriented normal to drum axis 28. Rock cutters 30 may each be rotatable by way of shafts or the like extending inwardly through drum 26. Any suitable mechanism for imparting rotation to rock cutters 30, or no mechanism in alternative embodiments, might be used. In the illustrated embodiment, drum 26 will be rotated about drum axis 28 while each of rock cutters 30 is individually rotated about their axes 32, with boom 34 swinging across a material face to effect a cutting pass. It can also be noted from FIG. 1 that cutting implement 24 is mounted upon one side of boom 34. During operation it will typically be desirable to orient cutting implement 24 so as to lead boom 34. For example, with cutting implement 24 positioned approximately as shown in FIG. 1 a cutting pass would be performed by rotating boom 34 about slew axis 48 to move cutting implement 24 to the right and into the page. When a cutting pass in an opposite direction is desired, boom 34 would be rotated via wrist 42 to reposition cutting implement 24 for a return pass again leading boom 34. It will be appreciated that slewing and/or swinging of boom 34 will typically move cutting implement 24 in an arc. Accordingly, when positioned generally along a longitudinal centerline of machine frame 12, cutting implement 24 will be positioned somewhat forwardly from where cutting implement 24 would be positioned when slewed left or right toward the extremes of its angular slew range. A similar phenomenon could be observed with respect to swinging of cutting implement 24. Solid arrows are shown in FIG. 1 to diagrammatically represent these general travel arcs of cutting implement 24 through space.

Figure 2:
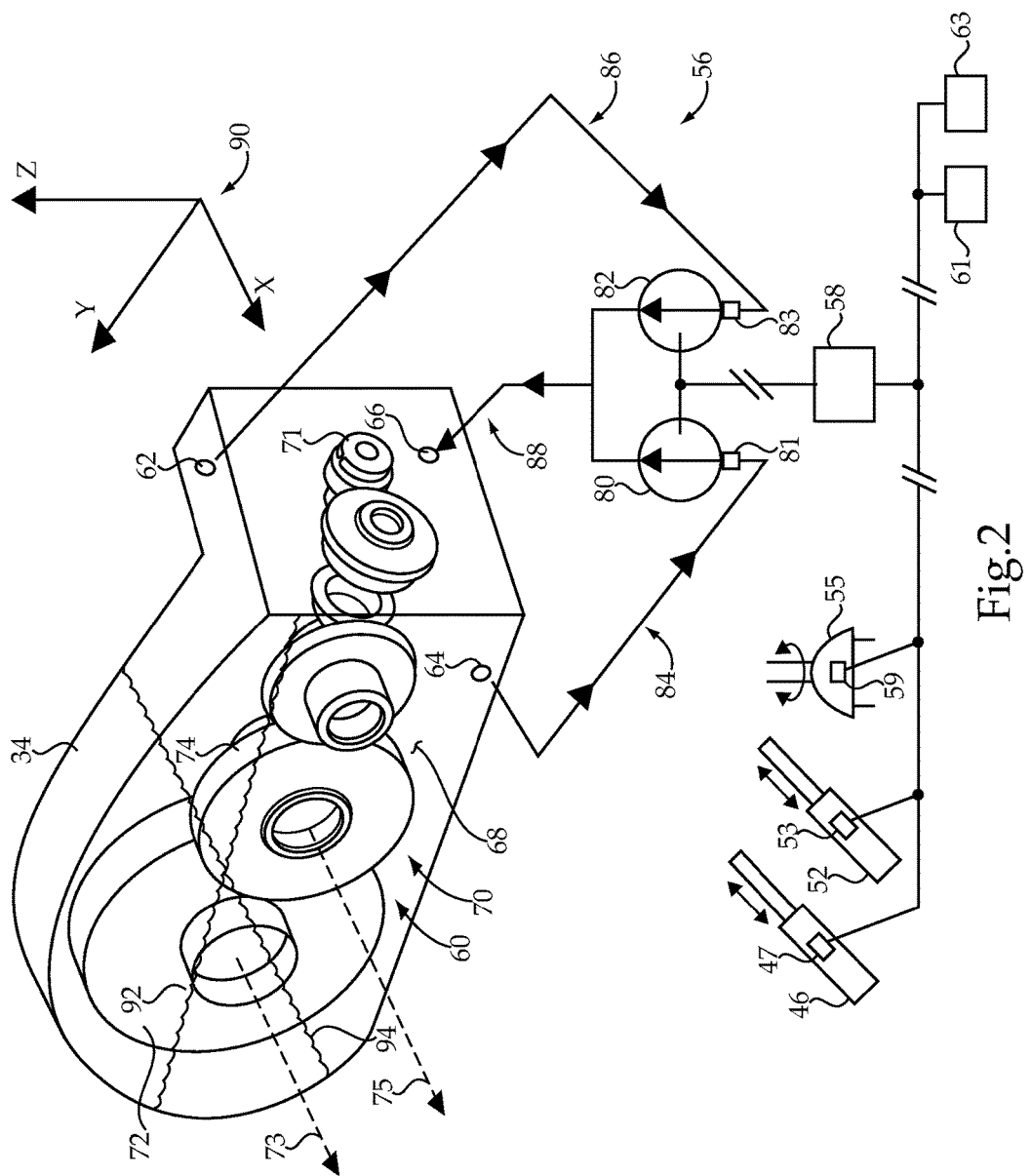
FIG. 2 is a diagrammatic view of portions of an implement system suitable for use in the machine of FIG. 1, according to one embodiment.

Referring also now to FIG. 2, it will be recalled that boom 34 supports cutting implement 24 and is movable to position cutting implement 24 in contact with a material to be cut. Boom 34 houses a drive mechanism 60 for cutting implement 24. In the illustrated embodiment, drive mechanism 60 includes a gear train 70 formed by a plurality of gears in mesh with one another. An input gear 71 may be provided which is driven by way of a drive shaft of a motor (not shown). An electric motor may be provided for applying a torque to input gear 71, and housed within or adjacent to wrist 42 and/or boom support section 40. Gear train 70 may also include an output gear 72 and one or more transfer gears 74. In FIG. 2 output gear 72 can be seen to define a gear axis 73 which may be an axis of rotation common with drum axis 28 in at least some embodiments. Transfer gear 74 may define a gear axis 75. Gear axes 73 and 75 may be located in a common plane, potentially common to other gear axes (not numbered) in gear train 70. Boom 34 forms a cavity 68 within which gear train 70 is at least partially positioned. Cavity 68 is configured for containing and conveying oil for lubricating and cooling components of gear train 70. It will be appreciated that rotation of the gears in gear train 70 can affect the location or distribution of oil within cavity 68. The location and distribution of oil within cavity 68 can also be affected by a position and/or orientation of boom 34. In FIG. 2 an approximate oil fill line 92 is shown that might be observed where gear train 70 is operating and boom 34 is declined about 15 degrees from a horizontal plane. Another approximate oil fill line 94 is shown and might be observed where gear train 70 is operating and boom 34 is inclined about 15 degrees from a horizontal plane. In the various other different drive mechanism configurations that might be implemented in the context of the present disclosure, different oil fill lines could be observed for different conditions. Moreover, it should be appreciated that rotation of boom 34 such as about wrist axis 44 would cause oil to be redistributed from that which is depicted in FIG. 2. It should further be appreciated that rotation as well as other motions of boom 34 will tend to cause some sloshing of oil within cavity 68, potentially impacting oil distribution at least temporarily. As alluded to above, implement system 22 is configured with certain of these concerns relating to oil distribution in mind, so that cutting implement 24 can be operated according to a full available range of positions and orientations without undue concern for continuity of lubrication or cooling.

To this end, boom 34 houses drive mechanism 60 and has formed therein a plurality of oil outlet ports including a first oil outlet port 62 and a second oil outlet port 64, for draining oil conveyed through boom 34 in contact with drive mechanism 60. One or more oil inlet ports 66 may further be provided. Implement system 22 also includes an oil pumping system 56 for circulating the oil through boom 34 and including at least one pumping mechanism. In the illustrated case the at least one pumping mechanism includes a first pump 80 and a second pump 82. Oil pumping system 56 ("system 56") further includes a plurality of incoming oil conduits including first incoming oil conduit 84 and a second incoming oil conduit 86 for connecting the at least one pumping mechanism 80, 82 to first oil outlet port 62 and second oil outlet port 64, respectively, and/or such additional oil outlet ports as might be provided. Any number of incoming oil conduits might be coupled one with each of any number of oil outlet ports. A control mechanism 58 is also provided and coupled with first pump 80 and second pump 82, as well as other components of system 56 as further discussed herein. Pump 80 may include a first suction port 81 that is fluidly connected with first incoming oil conduit 84, and second pump 82 may have a second suction port 83 that is fluidly connected with second incoming oil conduit 86. Control mechanism 58 may be configured to receive data indicative of an expected change in location of at least one of the plurality of oil outlet ports including one or both of first oil outlet port 62 and second oil outlet port 64 relative to an oil fill line within boom 34. To this end, control mechanism 58 may be coupled with a first sensor 47 associated with slew actuator 46, another sensor 53 associated with swing actuator 52, and another sensor 59 associated with a rotary actuator 55 that is configured to rotate wrist 42. Each of sensors 47, 53 and 59 can be a potentiometer or another suitable type of sensor. Control mechanism 58 may also be coupled with a pitch sensor 61 and a roll sensor 63, each coupled at a fixed location to machine frame 12 to monitor machine pitch and roll. Control mechanism 58 is further configured to vary the pattern of incoming oil flow among the plurality of incoming oil conduits based on the data indicative of an expected change in location by way of commanding switching system 56 between a first state receiving incoming oil flow through a first one of the plurality of incoming oil conduits such as first incoming oil conduit 84 and a second state receiving incoming oil flow through a second one of the plurality of incoming oil conduits such as second incoming oil conduit 86, to limit entrainment of air in the circulated oil.

It will be recalled that motion of boom 34 can change a location of oil fill line therein. Due to the different locations of first oil outlet port 62 and second oil outlet port 64, or other oil outlet ports, the oil fill line may in some cases be above both of first oil outlet port 62 and second oil outlet port 64, and in some instances between first oil outlet port 62 and second oil outlet port 64. In still other instances, the oil fill line could be below both of first oil outlet port 62 and second oil outlet port 64. Embodiments are contemplated where a single pump is used, and a valve assembly positioned fluidly between the single pump and cavity 68, with the valve being configured to selectively connect the single pump with a second one of a plurality of oil outlet ports. Similarly, a valve assembly and multiple pumps could also be used. The present disclosure illustrates a two-pump design with each of two pumps dedicated to a separate incoming oil conduit and oil outlet port, however, it will be appreciated that the disclosure is not limited as such.

Control mechanism 58, which may include any suitable programmable computer, may be configured to command switching of the oil pumping system 56 from the first state to the second state at least in part by commanding turning off one of first pump 80 and second pump 82 to cease application of suction to a first one of oil outlet ports 62 and 64, and turning on the other of first pump 80 and second pump 82 to begin application of suction to the second one of oil outlet ports 62 and 64. As noted above, there are also certain situations where both of the outlet ports of the two pumps could be above an oil fill line, such that the data received by control mechanism 58 indicative of an expected change in location is acted upon by commanding switching oil pumping system 56 to a third state where each of first pump 80 and second pump 82 is turned off based on the relative locations of each of first oil outlet port 62 and second oil outlet port 64 relative to the oil fill line. During operation, control mechanism 58 may be receiving data indicative of angular orientations of boom 34 about each of wrist axis 44, slew axis 48, swing axis 54, and also data of machine pitch and machine roll as described herein. Control mechanism 58 may be further configured to determine which of the plurality of oil outlet ports has a lowest location relative to a vertical axis, and to command the switching of system 56 so as to receive incoming oil flow from whichever of the plurality of oil outlet ports has the lowest location.

INDUSTRIAL APPLICABILITY

Figure 3:
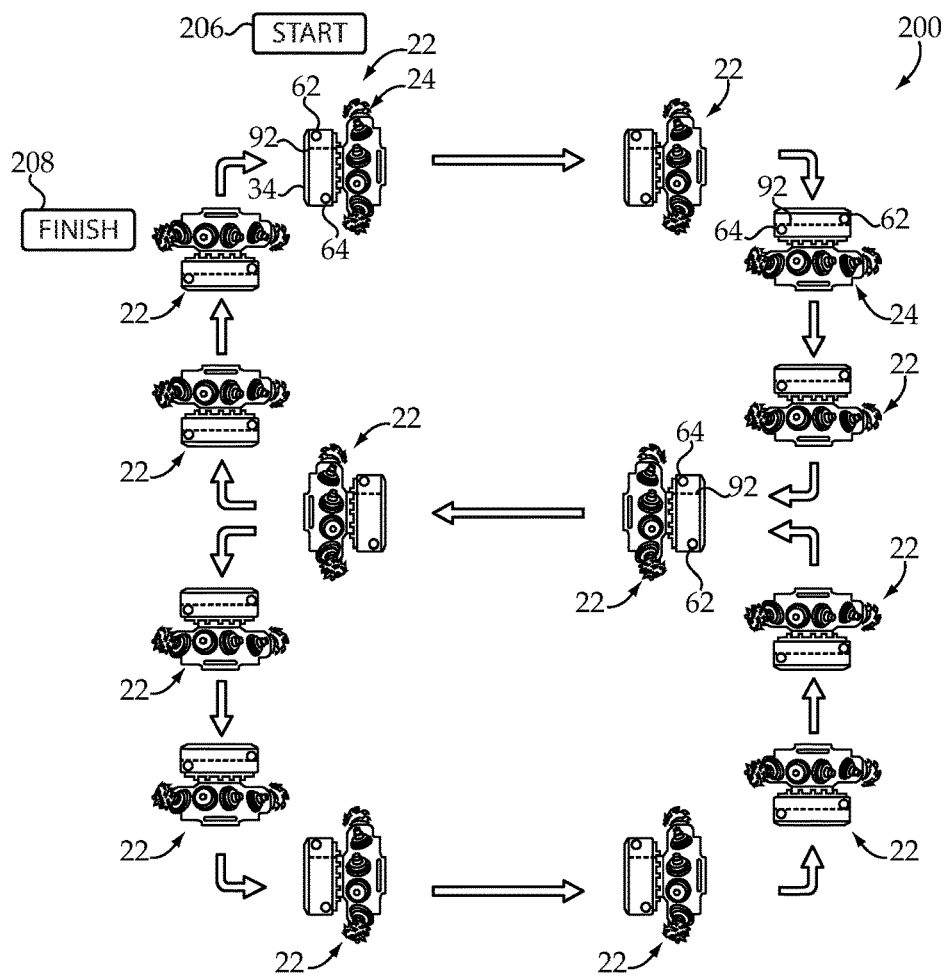
FIG. 3 is a diagrammatic view of a cutting pattern executed by a cutting implement, according to one embodiment.

Referring now to FIG. 3, a sequence of positions and orientations for a cutting pattern 200 executed by the cutting implement 24 is described. Further, there is shown implement system 22 with boom 34 and cutting implement 24 positioned at a plurality of different locations and orientations as might be observed during operating implement system 22 to carry out a rock or other material cutting operation. The sequence of positions and orientations of implement system 22 begins at a START 206 and according to the directional arrows shown in FIG. 3 executes a horizontal pass, such as by rotating about slew axis 48. After the initial horizontal pass, implement system 22 may be operated to rotate cutting implement 24 and boom 34 to begin a vertical, downward cutting pass. It can be seen that an oil fill line 92 changes in location relative to first oil outlet port 62 and second oil outlet port 64 as implement system 22 is operated to turn from the horizontal to vertical. Implement system 22 then executes a vertical downward cutting pass, and another turn to begin moving horizontally now back to the left. It can be seen that oil fill line 92 is again changed in location relative to first oil outlet port 62 and second oil outlet port 64. Following the directional arrows depicting generally the paths of implement system 22 it can be seen that cutting implement 24 and boom 34 will execute additional rotations, slewing, and swinging. Each time that implement system 22 is thusly adjusted, the relationship between the oil fill line and first oil outlet port 62 and second oil outlet port 64 can change, such that first oil outlet port 62 might be moved from a first location below oil fill line 92 to a second location above oil fill line 92 while second oil outlet port 64 is moved from a third location above oil fill line 92 to a fourth location below oil fill line 92. Control mechanism 58 may all the while be receiving data indicative of the locations and orientations of the various components that can affect whether either, both or neither of first oil outlet port 62 and second oil outlet port 64 are exposed to an air space above the oil fill line or exposed to oil below the oil fill line. The sequence of positions and orientations depicted in FIG. 3 may end at a FINISH 208. Other cutting paths or variations on the path shown might be executed in addition to or instead of that shown, including diagonal passes, repetition of passes, and still other possibilities without limitation to any particular strategy.

Figure 4:
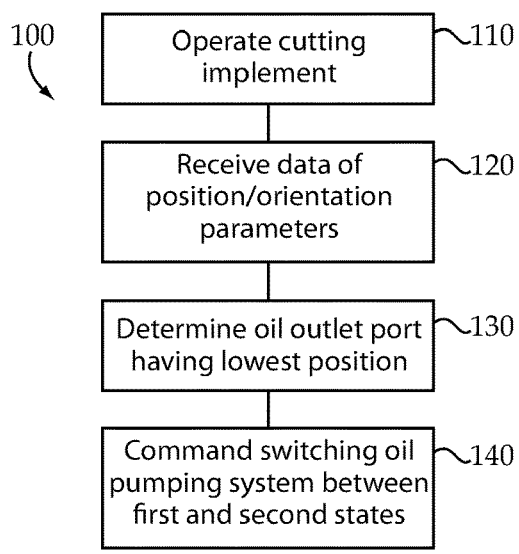
FIG. 4 is a flowchart illustrating example control logic and operating methodology, according to one embodiment.

Referring to the drawings generally, but in particular now to FIG. 4, there is shown a flowchart 100 illustrating example control logic flow and operating methodology according to one embodiment. At block 110, cutting implement 24, respectively, may be operated, from which point the logic may advance to block 120 to receive data of a plurality of position parameters and/or a plurality of orientation parameters relating to positions and/or orientations of boom 34 and cutting implement 24, as described herein. From block 120, the process may advance to block 130 to determine the oil outlet port having the lowest position. From block 130, the process may advance to block 140 to command switching the pumping mechanisms between the first state and the second state as described herein.

The present description is for illustrative purposes only, and should not be construed to narrow the breadth of the present disclosure in any way. For instance, embodiments are contemplated where use of all of a pitch sensor, roll sensor, wrist sensor, slew sensor, and swing sensor are employed to produce data indicative of each of a machine pitch angle, a machine roll angle, a wrist angle, a slew angle, and a swing angle of the boom. Each of these sensors could thus be used in connection with the parameters of machine pitch forward and back, machine roll side to side, wrist rotation about the wrist axis, slew of the implement system about the slew axis, and swing of the implement system about the swing axis. In some applications, however, an oil pumping system might be switched among states based on a value of a single parameter, such as wrist rotation angle alone within the context of the present disclosure. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An implement system for a machine, the implement system comprising:
   a cutting implement;
   a boom supporting the cutting implement and movable to position the cutting implement in contact with a material to be cut, the boom housing a drive mechanism for the cutting implement, and a plurality of oil outlet ports being formed in the boom, for draining oil conveyed through the boom in contact with the drive mechanism; and
   an oil pumping system for circulating the oil through the boom, the oil pumping system including at least one pumping mechanism, a plurality of incoming oil conduits for connecting the at least one pumping mechanism to the plurality of oil outlet ports, and a control mechanism for varying a pattern of incoming oil flow, the control mechanism being configured to:
      receive data indicative of an expected change in location of at least one of the plurality of oil ports relative to an oil fill line within the boom; and
      vary the pattern of incoming oil flow based on the data indicative of an expected change in location by way of commanding switching the oil pumping system between a first state receiving incoming oil flow through a first one of the plurality of incoming oil conduits and a second state receiving incoming oil flow through a second one of the plurality of incoming oil conduits, to limit entrainment of air in the circulated oil.

2. The implement system of claim 1 wherein the implement includes a drum rotatable about a drum axis, and a plurality of cutters positioned circumferentially about the drum axis and rotatable about a plurality of cutter axes oriented normal to the drum axis.

3. The implement system of claim 1 wherein the drive mechanism includes a gear train defining a plurality of gear axes located in a common plane, and wherein a first one of the plurality of oil outlet ports is located on a first side of the common plane and a second one of the plurality of oil outlet ports is located on a second side of the common plane.

4. The implement system of claim 3 further comprising an implement frame and a wrist coupled between the boom and the implement frame, and the wrist being rotatable to rotate the boom about a wrist axis in an angular rotation range relative to the implement frame that is at least 180 degrees.

5. The implement system of claim 4 wherein the boom is rotatable in generally horizontal directions about a slew axis relative to the implement frame, and in generally vertical directions about a swing axis relative to the implement frame.

6. The implement system of claim 5 wherein the data indicative of the expected change in location is indicative of moving the first one of the oil outlet ports from a first location below the oil fill line to a second location above the oil fill line, and moving the second one of the oil outlet ports from a third location above the oil fill line to a fourth location below the oil fill line.

7. The implement system of claim 6 further comprising a pitch sensor, a roll sensor, a wrist sensor, a slew sensor, and a swing sensor, and wherein the data includes data indicative of each of a pitch angle, a roll angle, a wrist angle, a slew angle, and a swing angle, of the boom.

8. The implement system of claim 7 wherein the control mechanism is further configured to determine which of the plurality of oil outlet ports has a lowest location relative to a vertical axis, and to command the switching of the oil pumping system to receive the incoming oil flow from whichever of the plurality of oil outlet ports has the lowest location relative to the vertical axis.

9. The implement system of claim 1 wherein the at least one pumping mechanism includes a first pump having a first suction inlet fluidly connected to a first one of the plurality of incoming oil conduits, and a second pump having a second suction inlet fluidly connected to a second one of the plurality of incoming oil conduits.

10. The implement system of claim 9 wherein the control mechanism is further configured to command switching the oil pumping system between the first state and the second state at least in part by commanding turning off the first pump and turning on the second pump.

11. The implement system of claim 10 wherein the data is indicative of relative locations of each of the plurality of oil outlet ports relative to the oil fill line, and the control mechanism is further configured to command switching the oil pumping system to a third state where each of the first pump and the second pump is turned off based on the relative locations of each of the plurality of oil outlet ports.

12. A machine comprising:
a machine frame;
ground-engaging propulsion elements coupled to the machine frame;
an implement system coupled to the machine frame and including a cutting implement movable relative to the machine frame, and a boom supporting the cutting implement;
a plurality of oil outlet ports formed in the boom, and the boom housing a drive mechanism configured for lubrication and cooling by way of oil conveyed through the boom to the plurality of oil outlet ports;
an oil pumping system for circulating the oil through the boom and including at least one pumping mechanism, and a plurality of incoming oil conduits for connecting the at least one pumping mechanism to the plurality of oil outlet ports;
the oil pumping system further including a control mechanism, and the control mechanism being configured to:
receive data indicative of a change in a position or an orientation of the cutting implement relative to the machine frame that varies an expected location of at least one of the plurality of oil outlet ports relative to an oil fill line in the boom; and
command switching the oil pumping system based on the data indicative of a change in a position or an orientation of the cutting implement from a first state receiving incoming oil flow through a first one of the plurality of incoming oil conduits to a second state receiving incoming oil flow through a second one of the plurality of incoming oil conduits.

13. The machine of claim 12 further comprising a wrist supporting the boom, and rotatable to rotate the boom about a wrist axis in an angular rotation range that is at least 180 degrees.

14. The machine of claim 13 wherein the at least one pumping mechanism includes a first pump having a first suction inlet fluidly connected to the first one of the plurality of incoming oil conduits, and a second pump having a second suction inlet fluidly connected to the second one of the plurality of incoming oil conduits.

15. The machine of claim 14 wherein the drive mechanism includes a gear train defining a plurality of gear axes located in a common plane, and wherein a first one of the oil outlet ports is located on a first side of the common plane and the second one of the plurality of oil outlet ports is located on a second side of the common plane.

16. The machine of claim 15 wherein the control mechanism is further configured to determine which of the plurality of oil outlet ports has a lowest location relative to a vertical axis, and to command the switching of the oil pumping system between the first state and the second state to receive the incoming oil flow from whichever of the plurality of oil outlet ports has the lowest location.

17. A method of operating an implement system having a cutting implement and a boom housing a drive mechanism lubricated and cooled by way of oil circulated through the boom, the method comprising:
monitoring a plurality of position parameters or orientation parameters of at least one of the boom or the cutting implement;
receiving data of the plurality of position parameters or orientation parameters indicative of an expected change to a location of an oil fill line in the boom relative to at least one of a first oil outlet port or a second oil outlet port each formed in the boom; and
commanding switching an oil pumping system in the implement system based on the data from a first state receiving an incoming flow of oil from the first oil outlet port to a second state receiving an incoming flow of oil from the second oil outlet port.

18. The method of claim 17 wherein the commanding of the switching of the oil pumping system includes commanding turning off a first pump to cease application of suction to the first oil outlet port and commanding turning on a second pump to begin application of suction to the second oil outlet port.

19. The method of claim 17 wherein the receiving data of the plurality of position parameters or orientation parameters further includes receiving data indicative of a change to a location of the oil fill line caused by rotating the boom to position the cutting implement for initiation of one of a horizontal cutting pass or a vertical cutting pass.

20. The method of claim 19 further comprising determining the second oil outlet port is lower than the first oil outlet port relative to a vertical axis, and commanding the switching of the oil pumping system based on the determining the second oil outlet port is lower than the first oil outlet port relative to the vertical axis.

* * * * *